United States Patent Office 3,506,408
Patented Apr. 14, 1970

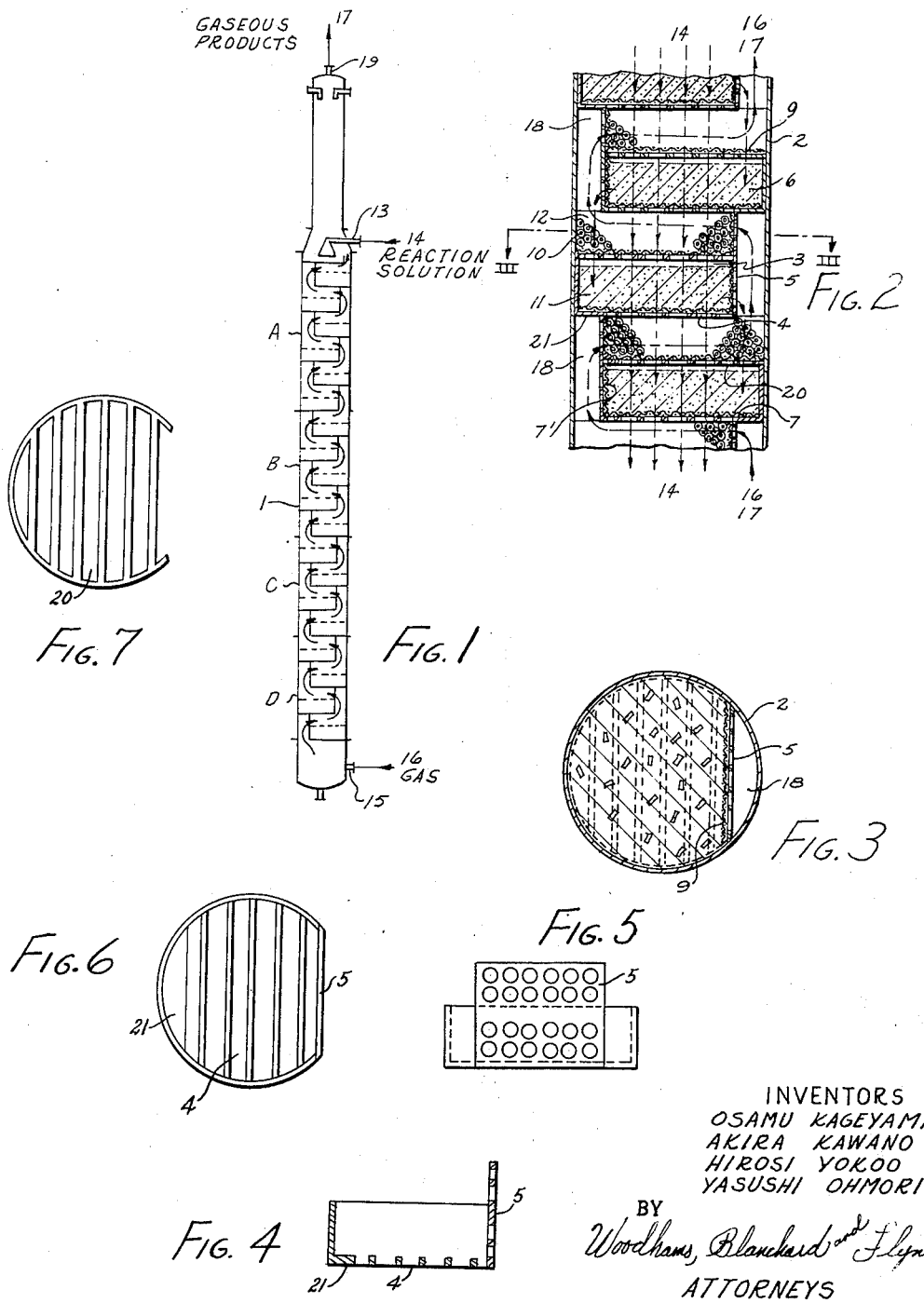

3,506,408
CONTINUOUS REACTION APPARATUS CONTAINING A SOLID GRANULAR CATALYST
Osamu Kageyama, Akira Kawano, Hiroshi Yokoo, and Yasushi Ohmori, Saitama, Japan, assignors to Daicel Ltd., Higashi-ku, Osaka, Japan, a corporation of Japan
Filed Feb. 13, 1967, Ser. No. 617,010
Claims priority, application Japan, May 24, 1966, 41/33,123
Int. Cl. B01j 9/04
U.S. Cl. 23—288                              6 Claims

ABSTRACT OF THE DISCLOSURE

A continuous multistage reaction apparatus for carrying out a liquid-liquid phase reversible reaction and having a plurality of vertically arranged reaction zones, each zone having a lower catalyst layer and an upper heat exchange and mass transfer layer, and vapor passageways extending between the upper layers of the reaction zones so that the lower boiling point products of the reaction can be vaporized and removed from the apparatus without passing through the catalyst layers in the higher reaction zones.

---

This invention relates to a continuous multistage reaction apparatus for continuously carrying out a liquid-liquid phase reversible reaction accompanied by the production of a gas, such as the reactions

or

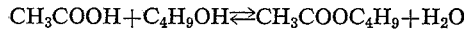

while in contact with a solid catalyst, such as grains of an ion-exchange resin.

This type of reaction has been conventionally carried out by continuously feeding a reaction-contributing solution into a vertical reactor which contains a layer of solid catalyst grains so that the solution comes into contact with the catalyst layer. In order to advantageously carry out such a reversible reaction, measures, such as the continuous removal of a part or all of the reaction product from the system, have generally been taken so that chemical equilibrium may be prevented. Commonly a reaction-contributing solution is fed continuously into the system, near the top of the tower, and made to flow downwardly irrigating the catalyst layer so that the components of the solution are caused to react. This reaction layer is maintained near the boiling point of the gaseous product by such means as a heating jacket provided in the wall of the tower or by a heating pipe provided in the tower. All, or at least part, of the reaction product is vaporized and removed through the top of the tower. The product is then condensed and collected by means of a condenser attached to the top of the tower.

The ion-exchange resin catalysts, which are ordinarily used, are comprised of small diameter grains and this fact, together wtih the countercurrent contact between the rising gasified product being removed from the reaction system and the downwardly flowing solution, is apt to cause a flooding in a conventional packed tower. Thus, often it will become impossible to continuously carry out the reaction under steady state conditions.

Further, since the vaporized product, which is removed from the system to prevent the reverse reaction, rises through the reaction tower, and comes in contact with the falling solution and in contact with the catalyst, the attempt to prevent a reverse reaction is not completely successful in a conventional packed reactor.

In the present invention these problems have been solved by providing shelves, each having a catalyst layer and a gas-liquid contact heat exchanging layer, the shelves being so positioned that vapor passages are located alternately on the right and left between each shelf and the side of the tower. As the reaction solution, which is fed in through the upper part of the tower, falls down through the catalyst layer and the gas-liquid contact heat exchanging layer, the products produced by the contact of the solution with the catalyst in the reaction layers may be vaporized in the reaction layers, may pass through the vapor passages together with hot gas rising from below and may thus rise through the tower, while effectively making heat and mass transfer contact with the solution in the heat exchanging layers, but without the occurrence of any reverse reaction.

The present invention shall now be explained with reference to the drawings in which:

FIGURE 1 is an elevational view of a reaction tower showing an apparatus embodying the present invention;

FIGURE 2 is an enlarged sectional view of the invention;

FIGURE 3 is a plan view taken on the line III—III in FIGURE 2;

FIGURE 4 is an elevation showing a cross section of a shelf with metal screens removed;

FIGURE 5 is a side view of FIGURE 4;

FIGURE 6 is a plan view of FIGURE 4; and

FIGURE 7 is a plan view of a grid plate.

A plurality of shelves 3, each having a catalyst packed reaction layer 11 and a gas-liquid contact heat exchanging layer 12, are arranged in a vertical stack in a cylindrical body 2 of a reaction tower 1. The reaction tower is divided into parts A, B, C and D. The shelves 3 are arranged so that each shelf is sidewardly offset from the shelves directly above and below and the shelves are of less width than the diameter of the cylindrical body 2 so that vapor passages 18 are provided, said passages being located alternately on the right and left sides of said cylindrical body between the shelf and the inside wall of the cylindrical body 2. Each shelf 3 has a grid-like bottom plate 4 and a flat side wall plate 5 made of perforated plates and covered on the inside surfaces thereof with fine mesh metal screens 7 and 7' so that the solid catalyst grains 6 with which the shelf is packed may not leak out. On each shelf 3 above the catalyst reaction layer 11, there is provided a metal screen 9 of coarse mesh supported by a grid plate 20. Packing material, such as Raschig rings 10, is placed on the screen 9 so as to form a gas-liquid contact heat exchanging layer 12 above the catalyst layer.

The reaction-contributing solution 14 is fed in through a feeding pipe 13 provided in the upper part of the reaction tower 1. The solution flows downwardly and drops in succession through the gas-liquid contact heat exchanging layers 12 and the catalyst reaction layers 11. The solution will be maintained at a proper reaction temperature by making heat exchange and mass transfer contact with the rising hot gas 16 fed in through a feeding inlet pipe 15 in the lower part of the tower. Reverse reaction will be minimized or eliminated since no catalyst is present in the gas-liquid heat exchanging layers 12 so that substantially no reaction can take place there. At the same time, the low boiling point product entering a given layer 12 from above will be vaporized and removed from the reaction solution. Thus, the reaction solution will be substantially stripped of the product of the reaction before it enters the next catalyst reaction layer 11. The reaction solution which enters the next reaction layer 11 will react due to its contact with the catalyst, and such reaction will proceed efficiently because the greater part of the low boiling point product produced in the preceding reaction layer will have been vaporized and removed with the upwardly flowing gas stream. The gaseous product taken out of a given reaction layer 11, will rise through vapor passages 18 and the gas-liquid contact heat exchanging layers 12 without passing through the other reaction layers 11 above it and will be fed into a condenser (not illustrated) through a gaseous product outlet pipe 19 at the top of the tower, there to be condensed and collected.

In the present apparatus, an imperforate baffle portion 21 is provided in a part of the grid-shaped bottom plate 4 of each shelf 3 and said baffle portion forms the top of the vapor passage 18. Thus, the rising hot gas 16 and the gaseous product 17 taken out of the reaction layers will advance straight through the vapor passages 18 and the gas will be deflected by the baffle portions 21 and will not enter the catalyst reaction layers 11 so that the gas will pass only through the gas-liquid contact heat exchanging layers 12. The baffle portions 21 will also prevent the downflowing liquid from entering the passages 18.

In the present invention, as the reactant solution flows downwardly and as the hot gas rises, no counter-current flow of the gas and liquid occurs in catalyst layers. Therefore, no overflowing of the catalyst, as is common in the conventional methods, will occur. The gaseous reaction product once taken out of the reaction layer 11 will directly contact the reaction-contributing solution above the catalyst layer and will not inhibit the forward reaction in a liquid phase in the catalyst layer. Thus, it has become possible to carry out the reaction in each stage very advantageously.

The layers 12 and the vapor passages 18 will be sufficiently open that the gas will be capable of flowing freely therethrough so that there will be a relatively low-pressure drop across layers 12. The layers 11, on the other hand, which consist of fine grains, as well as the liquid which is present in said layers 11, provide considerable resistance to the flow of the gas so that there will be a relatively high-pressure drop across layers 11. Thus, the gas will flow laterally through the layers 12 and no substantial flow of gas will occur through the layers 11.

Further, in the present invention, as the gas-liquid contact heat exchanging layers are provided alternately between the catalyst reaction layers, the reaction-contributing solution and gaseous product will not contact each other in the catalyst layers and will not impair the rate of the reaction in the catalyst layers. Further, the heat exchange and mass transfer operations can be easily carried out without requiring such complicated structure as attaching a jacket to the reaction tower or setting a heating pipe in the catalyst layer. Thus, the composition and temperature of the reaction-contributing solution entering the catalyst layer can be directly and effectively maintained at a proper level.

What is claimed is:

1. A continuous reaction apparatus comprising:
   a tower;
   a plurality of perforated vertically spaced shelves in the tower, each shelf having a fixed catalyst layer and a fixed gas-liquid contact heat exchanging layer, said layers being disposed one above the other, said catalyst layer being comprised of a bed of catalyst grains of relatively small size, said gas-liquid contact heat exchanging layer being comprised of relatively large size packing objects so that the pressure drop across said heat exchanging layer is less than the pressure drop across said catalyst layer;
   a plurality of upwardly extending vapor riser passages, each passage extending between and communicating with the heat exchanging layers of two of said shelves, each of said heat exchanging layers communicating on one side thereof with the upper end of one vapor riser passage and communicating on the opposite side thereof with a lower portion of another vapor riser passage, said one vapor riser passage being horizontally offset from said another vapor riser passage, the upper end of each of said vapor riser passages being in fluid flow communication only with the adjacent heat exchanging layer so that the vapor rising to the upper end of each passage flows into and horizontally through said adjacent heat exchange layer;
   means for admitting a reaction solution to the upper end of the tower and means for admitting heated gas to the lower end of the tower;
   so that a reaction solution flowing down from the upper part of the tower may react in the catalyst layers and the produced gaseous product may pass upwardly through the vapor riser passages and through the gas-liquid contact heat exchanging layers together with hot gas rising from the bottom of the tower and may make heat and mass transfer contact with said reaction solution flowing downwardly in the gas-liquid contact heat exchanging layers.

2. The apparatus according to claim 1 wherein each shelf has a perforate area on which the catalyst layer rests, each shelf also having an imperforate area forming a baffle across the upper end of the adjacent lower vapor riser passage for deflecting the rising gas into the adjacent gas-liquid contact heat exchanging layer.

3. A continuous reaction apparatus comprising:
   a tower;
   inlet means for introducing a liquid reactant solution into the upper end of said tower and for admitting a heated gas into the lower end of the tower;
   outlet means for removing products from said tower;
   a plurality of vertically spaced perforated shelves defining reaction zones in which chemical reactions may take place, each reaction zone including a fixed catalyst layer containing a catalyst material for providing a relatively large pressure drop thereacross and a fixed heat exchange and mass transfer layer disposed above said catalyst layer, said heat exchange and mass transfer layer containing a material for providing a pressure drop thereacross which is less than the pressure drop across said catalyst layer;
   a plurality of upwardly extending vapor riser passages, each passage extending between and communicating with the heat exchange and mass transfer layers of two of said reaction zones, each of said heat exchange and mass transfer layers communicating at one portion thereof with the upper end of one vapor riser passage and communicating at another portion thereof with the lower end of another vapor riser passage, said another portion being horizontally offset from said one portion, the upper end of each of said vapor riser passages being in fluid flow communication only with the adjacent heat exchange and mass transfer layer so that the vapor rising to the upper end of each passage flows into and horizontally through the adjacent heat exchange and mass transfer layer; whereby gaseous products from each of said reaciton zones may flow upwardly through the tower without substantially passing through the catalyst layers of the other reaction zones.

4. The apparatus defined in claim 3 wherein said inlet means includes
   a first inlet conduit located near the upper portion of said tower whereby liquid reactants may be introduced into said tower; and
   a second inlet conduit located near the lower portion of said tower whereby a hot gas may be introduced into said tower.

5. The apparatus defined in claim 4 wherein said outlet means includes
   a first outlet conduit located near the upper portion of said tower whereby gaseous products may be removed from said tower;
   a second outlet conduit located near the lower portion of the tower whereby liquid products may be removed from said tower.

6. The apparatus defined in claim 3 wherein said reaction zones comprise
    a plurality of vertically spaced pairs of shelves, each of said pairs including,
    a first shelf member defined by a fine mesh grid-like bottom wall and a fine mesh grid-like side wall and fine grain catalyst contained on said first shelf member,
    a second shelf member disposed above said first shelf member and having a perforate bottom wall and a perforate side wall and relatively large size packing material contained on said second shelf member,
    the shelves in each reaction zone extending partway across the interior of said tower to form a vapor riser passage between said shelves and the interior wall of said tower, the shelves in each reaction zone being sidewardly off-set from the shelves in the reaction zones above and below so that the vapor riser passages are alternately arranged on opposite sides of said tower,
    an imperforate baffle portion disposed above the upper end of each of said vapor riser passages whereby upwardly flowing vapors are deflected through said perforate side walls of the second shelf members and whereby said downwardly flowing reactant solution is prevented from entering said vapor riser passages.

References Cited

UNITED STATES PATENTS

| | | | |
|---|---|---|---|
| 2,934,326 | 4/1960 | Strand | 261—113 |
| 3,048,468 | 8/1962 | Watkins | 23—1 |

JAMES H. LAYMAN, Jr., Primary Examiner

U.S. Cl. X.R.

23—283, 1; 196—134; 202—158; 208—107; 210—283, 284; 261—114